(12) United States Patent
Wu et al.

(10) Patent No.: US 11,543,289 B1
(45) Date of Patent: Jan. 3, 2023

(54) OPTICAL FIBER CENTER AND FIELD OF VIEW DETECTION

(71) Applicant: MLOptic Corp, Redmond, WA (US)

(72) Inventors: Pengfei Wu, Bellevue, WA (US); Wei Zhou, Sammamish, WA (US); Daniel Hack, Seattle, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 17/901,576

(22) Filed: Sep. 1, 2022

(51) Int. Cl.
  *G02B 6/04* (2006.01)
  *G01J 1/02* (2006.01)
  *G06T 7/73* (2017.01)
  *G01J 1/18* (2006.01)

(52) U.S. Cl.
  CPC ............ *G01J 1/0266* (2013.01); *G01J 1/18* (2013.01); *G06T 7/74* (2017.01)

(58) Field of Classification Search
  CPC .......... G01B 11/26; G01J 1/0266; G01J 1/18; G06T 7/74; G01N 2201/08
  USPC ....... 356/124–127, 153, 73.1, 614–623, 138, 356/237.1–237.5; 385/52, 67, 97; 382/151
  See application file for complete search history.

(56) References Cited

U.S. PATENT DOCUMENTS

| | | | | |
|---|---|---|---|---|
| 5,386,819 A | * | 2/1995 | Kaneko | A61B 5/0059 600/177 |
| 5,553,184 A | * | 9/1996 | Eikelmann | G02B 6/04 385/115 |
| 7,079,743 B2 | * | 7/2006 | Lauzier | G01M 11/31 356/73.1 |
| 2002/0198515 A1 | * | 12/2002 | Somani | A61F 9/008 606/4 |

* cited by examiner

*Primary Examiner* — Hoa Q Pham
(74) *Attorney, Agent, or Firm* — Tracy Jong Law Firm; Tracy P. Jong; Cheng Ning Jong

(57) ABSTRACT

A method for locating a center of a field of view of an optical element using a system having a surface disposed at a first illumination, an image receiver, a blocker disposed at a second illumination, the method including disposing the blocker at, at least one location in the field of view upon the surface in a first direction when the brightness of an image within the field of view of the optical element is disposed at a brightness and recording a first location of the blocker; repeating the disposing step in a second direction and at the brightness, wherein the second direction is opposite the first direction and each of the first direction and the second direction is parallel to the surface; and averaging the first location and the second location to yield the center of the field of view of the optical element in the first direction.

28 Claims, 10 Drawing Sheets

OPTICAL FIBER CENTER AND FIELD OF VIEW DETECTION

BACKGROUND OF THE INVENTION

1. The Field of the Invention

The present invention relates to an optical fiber center and field of view detection tool and method. More specifically, the present invention is directed to an optical fiber center and field of view detection tool and method for fiberoptic-equipped devices.

2. Background Art

Fiber axial detection is critical for fiber-to-target, fiber-to-fiber and multi-fiber alignment, especially in the fields of fiber detection, optical communication, silicon-photonics, laser machining and fabrication. Conventionally, the simplest alignment system and method is for fiber axial detection function based on mechanical tolerances and various types of fiber connectors, V-shape fiber holders or adaptors may be used to perform these functions. In the field of industrial photonics automation including micro-manufacturing, fiber fusion splicing and silicon photonics alignment applications, active fiber optic alignment stage systems are commonly required, e.g., motorized fiber positioners, piezo-electric scanning modules or six-dimensional (6D) micro-motion robotic alignment systems. These equipment and systems are very expensive. In addition, extensive software and algorithm may be required to be integrated with the motorized systems for full automation.

In some cases, especially in target illuminating detection, spectral detection and hyperspectral imaging detection, the fiber axial pointing direction as well as its field of view need to be exactly monitored, in order to precisely acquire spectral or spatial information from the region of interest on the target. However, the methods mentioned above for fiber alignment do not meet these application requirements as the fiber axis and field of view may be varied depending on the fiber type and profile. In addition, the fibers used in such applications are commonly multi-mode or specific photonic fibers which have relatively large core diameters, unique fiber cross-section structures and shapes. Unlike the single-mode fiber, the sensitivity distribution and detection field of view need to be determined for each specific fiber, therefore requiring a large number of measurements to be made for center determinations.

There exists a need for a tool and/or methodology to align a fiber that is cost effective, simple to use and one which can yield high-level measurement throughputs.

SUMMARY OF THE INVENTION

In accordance with the present invention, there is provided a system configured for determining a center of a field of view of an optical element using a surface disposed at a first illumination, the system including:
(a) an image receiver configured for receiving at least one image through the optical element of the surface, wherein the image receiver is disposed at a fixed perpendicular distance to the surface disposed at the first illumination;
(b) a blocker disposed at a second illumination;
(c) a positioner configured for positioning the blocker at, at least one position such that the at least one image can be obtained by the image receiver; and
(d) a processor configured with instructions to compute at least one brightness value, one for each of the at least one image, the at least one image includes at least one first image and at least one second image, the at least one first image corresponds to an image obtained with the blocker disposed along a first direction and the at least one second image corresponds to an image obtained with the blocker disposed along a second direction, wherein the second direction is opposite the first direction, each first image corresponds to a positional value of the blocker in the first direction and one of the at least one brightness value, each second image corresponds to a positional value of the blocker in the second direction and one of the at least one brightness value and the first direction is parallel to the surface, wherein the center of a field of view in one of the first direction and the second direction is determined based on an average positional value of at least one pair of positional values including one of the at least one positional value of the blocker in the first direction at the at least one brightness value and one of the at least one positional value of the blocker in the second direction at the at least one brightness value.

In one embodiment, the at least one image further includes at least one third image and at least one fourth image, the at least one third image corresponds to an image obtained with the blocker disposed along a third direction and the at least one fourth image corresponds to an image obtained with the blocker disposed along a fourth direction, wherein the fourth direction is opposite the third direction, each of the at least one third image corresponds to a positional value of the blocker in the third direction and one of the at least one brightness value, each fourth image corresponds to a positional value in the fourth direction and one of the at least one brightness value, wherein the center of a field of view in one of the third direction and the fourth direction is determined based on an average positional value of at least one pair of positional values including one of the at least one positional value of the blocker in the third direction at the at least one brightness value and one of the at least one positional value of the blocker in the fourth direction at the at least one brightness value and each of the third direction and the fourth direction is perpendicular to the first direction.

In accordance with the present invention, there is further provided a method for locating a center of a field of view of an optical element using a system having a surface disposed at a first illumination, an image receiver, a blocker disposed at a second illumination, the method including:
(a) disposing the blocker at, at least one location in the field of view upon the surface in a first direction when the brightness of an image within the field of view of the optical element is disposed at a brightness and recording a first location of the blocker;
(b) repeating the disposing step in a second direction and at the brightness, wherein the second direction is opposite the first direction and each of the first direction and the second direction is parallel to the surface; and
(c) averaging the first location and the second location to yield the center of the field of view of the optical element in one of the first direction and the second direction.

In one embodiment, the method further includes repeating the steps (a)-(c) through by replacing the first direction with a third direction and the second direction with a fourth direction, each of the third direction and the fourth direction is parallel to the surface and each of the third direction and the fourth direction is perpendicular to the first direction.

In one embodiment, the surface is a surface selected from the group consisting of a light panel and a computer screen. In one embodiment, the optical element is an optical fiber. In one embodiment, a difference in brightness between the blocker and the surface disposed at the illumination is at least about 200 nits. In one embodiment, the first illumination is greater than the second illumination. In one embodiment, the second illumination is greater than the first illumination. In one embodiment, at least one of the first illumination and the second illumination is a result of a Light Emitting Diode (LED). In one embodiment, at least one of the first illumination and the second illumination is a result of an illumination of a computer screen.

An object of the present invention is to provide a non-contact and non-intrusive tool and method for the alignment of an optical fiber relative to an optical device.

Another object of the present invention is to provide a tool and method for the alignment of an optical fiber relative to an optical device, where the tool and method do not require the skill level required for a prior art tool and method for performing such an alignment.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only is typical embodiments of the invention and are not therefore to be considered to be limiting of its scope, the invention will be described and explained with additional specificity and detail through the use of the accompanying drawings in which.

PARTS LIST

Figure 1:
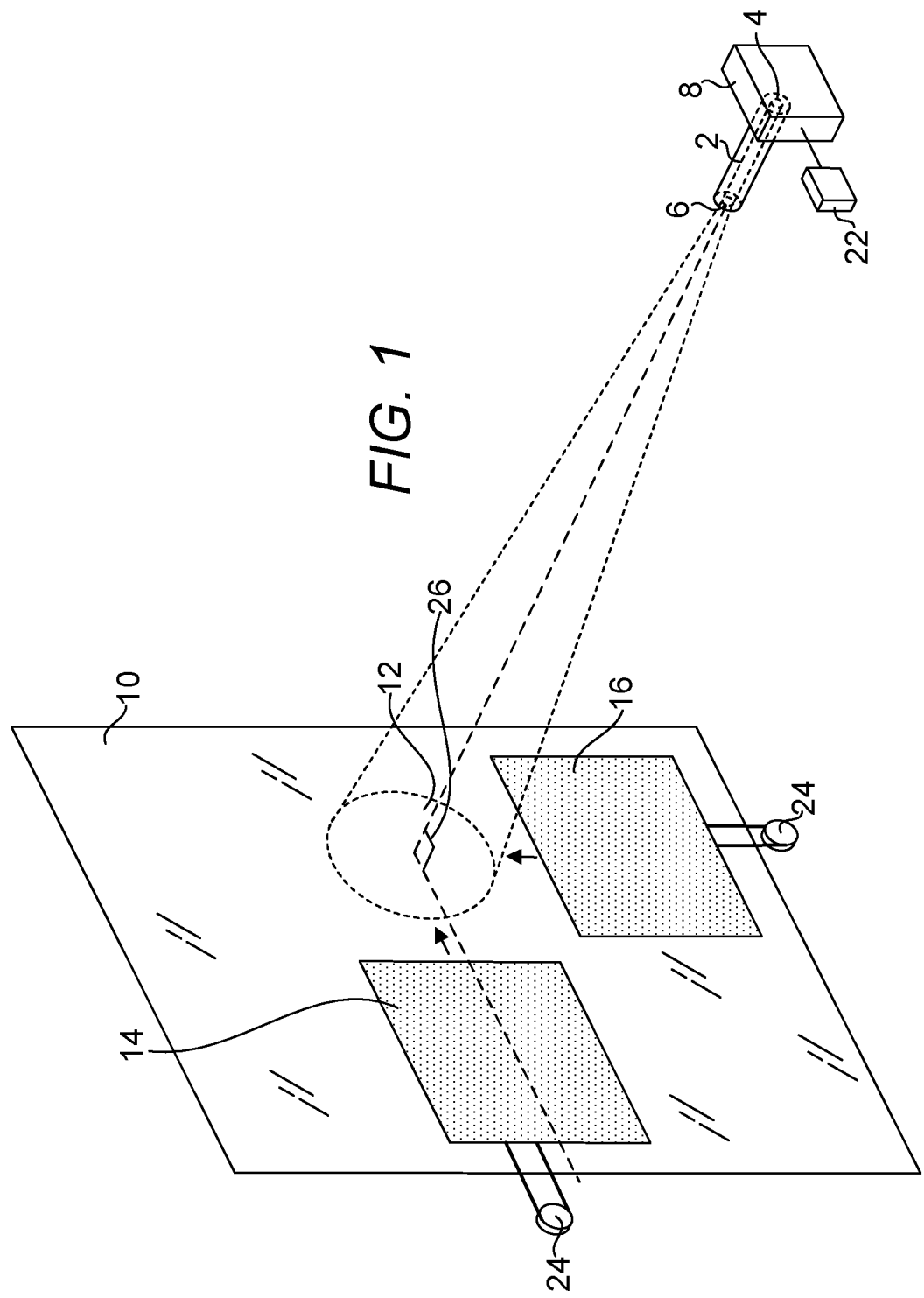
FIG. 1 is a non-intrusive setup of an optical fiber in which a center of the optical fiber is determined.

2—optical fiber
4—view as received at image plane of imaging device, e.g., camera
6—view opening
8—imaging device
10—light panel or any uniform illuminated screen
12—area of light panel from which image is cast on the image plane of imaging device
14—blocker
16—blocker
18—leading edge of blocker
20— trailing edge of blocker
22—controller or computer, including a processor
24—positioner
26— angle between light panel and a plane in which light panel is disposed and a direction in which optical fiber is disposed
28—angle between two perpendicularly-disposed directions in which blockers are moved to affect the luminance of a light panel
30—line representing brightness versus location data obtained from left to right
32—line representing brightness versus location data obtained from right to left
34—average of line representing brightness versus location data obtained from left to right and line representing brightness versus location data obtained from right to left
36—direction in which blocker is moved Particular Advantages of the Invention The present system and method for aligning and finding the center of an optical fiber do not require any modifications to an optical device under alignment as they use a non-contact external tool which does not affect the integrity of any equipment containing the optical fiber in any manner. This is particularly advantageous in situations, e.g., a factory floor or position sensitive situations as the output of the optical device can be checked without being touched or removed from its setup. The present system and method also require less knowledge on part of a technician or operator to operate, therefore removing the need for a skilled individual to perform the task of finding the center of an optical fiber.

The present optical alignment system is also capable of co-alignment for both the optical device, e.g., a camera and an optical fiber when the camera is disposed or configured to be useful for aligning the fiber. Further, the present optical alignment system is useful for a wide spectral range of from ultraviolet (UV) and visible light to infrared (IR). Further, the present optical alignment system is applicable to all types of optical fibers including single mode and multi-mode optical fibers. Further, the present optical alignment system is capable of precise detection of both central axial direction and fiber field of view. Further, the present optical alignment system is easy to setup for fiber inspection and its associated method provides highly accurate alignment results. Overall, the present optical alignment system and method involve lower costs due to the simpler setup and the lack of a need to modify any equipment associated with the alignment of the optical element, e.g., optical fiber, etc.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
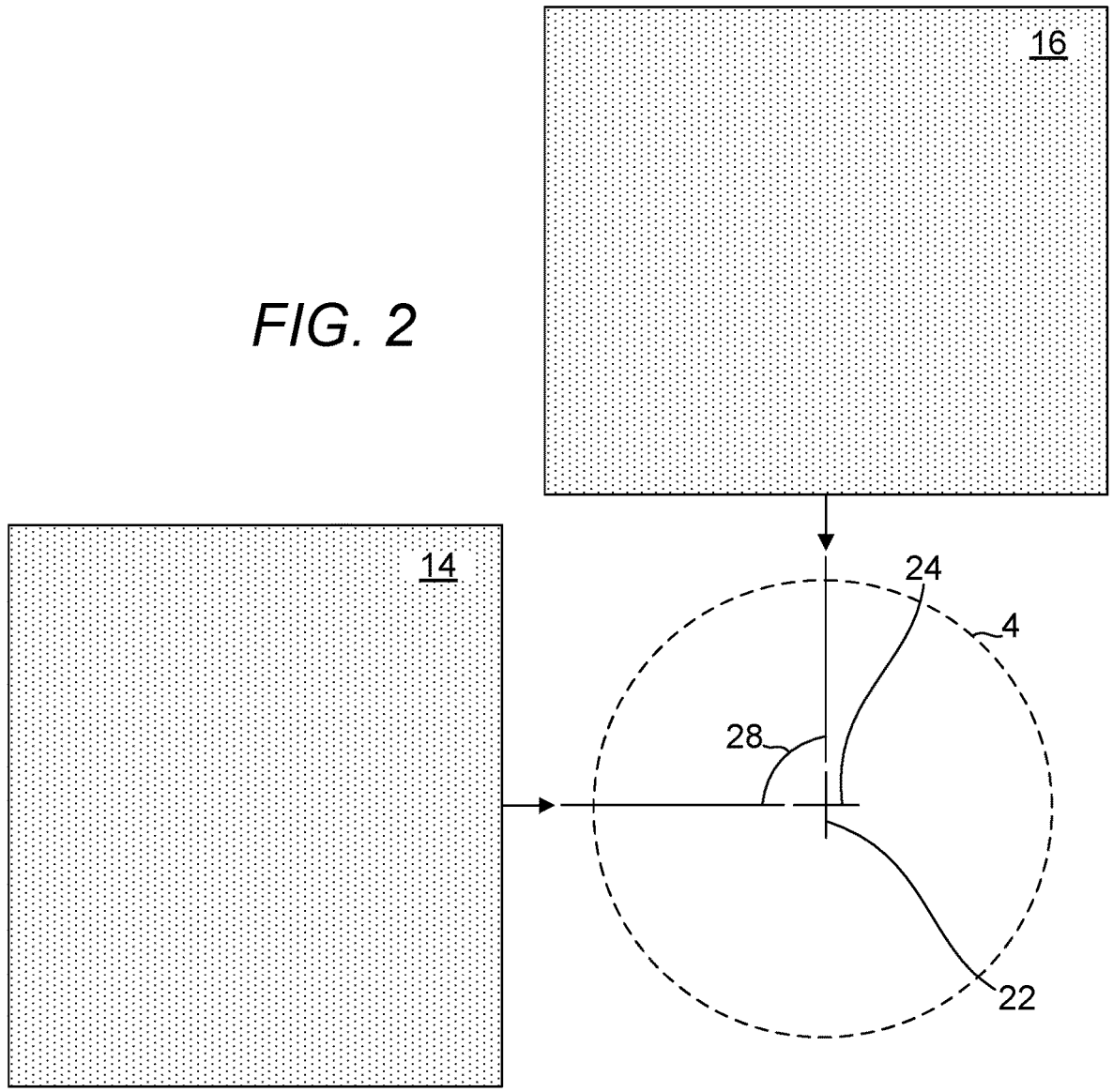
FIG. 2 is a diagram depicting the use of a light panel to collect data useful for determining the center of an optical fiber.

FIG. 1 is a non-intrusive setup of an optical fiber 2 or simply fiber, as used herein, in which a center of the fiber 2 is determined. FIG. 2 is a diagram depicting the use of a light panel 10 to collect data useful for determining the center of a fiber 2. An imaging device 8 or image receiver is disposed at a proximal end of the fiber 2 and a light panel 10 is disposed at a distance from a distal end of the fiber 2. In the embodiment shown, a light panel 10 is used although any uniform illuminated panel including, but not limited to a computer screen, can be used as shown elsewhere herein. A blocker 14, 16 is used to alter or affect the luminance of the area within the field of view of a fiber 2 under test as allowed by a view opening 6 of the fiber 2 and as received at an imaging device 8 configured to receive an image of area 12. Although two blockers 14, 16 are shown, it shall be noted in the ensuing description that, only one blocker 14, 16 is required. Two blockers 14, 16 are shown to depict a direction in which the blocker 14, 16 is moved to affect the luminance of the light panel as viewed from the imaging device 8. A blocker 14, 16 is preferably moved using a positioner for accuracy, i.e., to the nearest pixel position. It shall also be noted that a first direction in which blocker 14 is displaced shall be perpendicular to a second direction in which blocker 16 is displaced such that a two-dimensional center can be determined. It shall be noted that angle 28 shall also be a right angle. A center determined along a first dimension yields only a center disposed on a first line that is perpendicular to the direction in which blocker 14 is displaced. A center determined along a second dimension yields only a center disposed on a second line that is perpendicular to the direction in which blocker 16 is displaced. The point of cross-section of the first and second lines then becomes the two-dimensional center of the view 4 as seen at the imaging device. As a result of the setup, a view 4 can be received at the imaging device 8. It shall be noted that a plane in which the light panel 10 is disposed is perpendicular to a cross-sectional face of the fiber 2, i.e., angle 26 is a right angle. A blocker 14, 16 shown in FIGS. 1 and 2 can be made of any material as long as its surface is disposed at properties capable of a uniform luminance that is different from the light panel 10. The position of each blocker 14, 16 along a direction must be known and used in a consistent manner. In other words, if the position of a blocker's first leading edge is used when the blocker is moved in a first direction in a process to determine the positions at which various brightness values are achieved, the blocker's other edge (trailing edge 18) that is disposed opposite of the first leading edge must be used when the blocker is moved in a direction opposite the first direction in a process to determine the positions at which same brightness values are achieved. This way, the central position at each brightness can be resolved by taking an average of the positions with approaches from opposing directions. The present concept of utilizing the setup shown in FIGS. 1-2 to obtain the center of an object under test, e.g., a fiber, shall become clearer upon examining the ensuing figures and their corresponding descriptions.

Figure 3A:
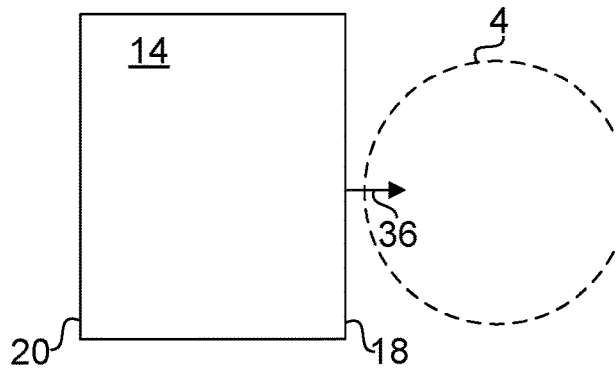
FIG. 3A-F is a series of diagrams depicting a process of moving a blocker, from left to right, into the field of view of an optical fiber while the brightness of the light panel within the field of the view of an optical fiber and the positional data of the cast light are recorded.
Figure 3B:
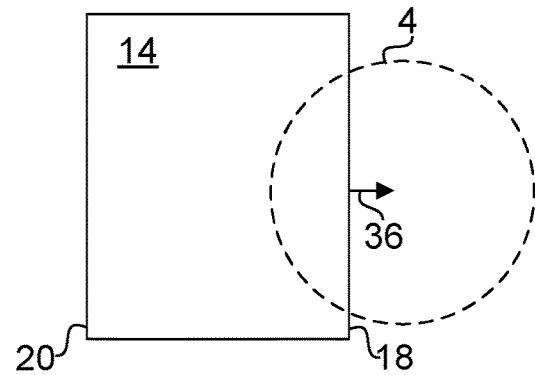
Figure 3C:
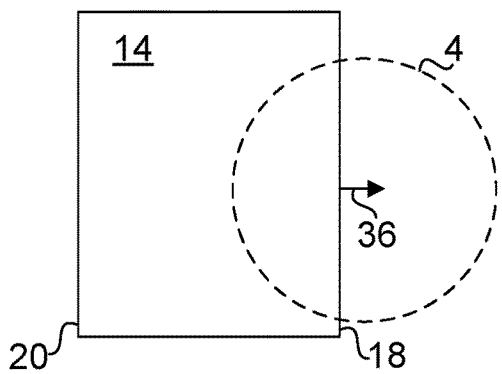
Figure 3D:
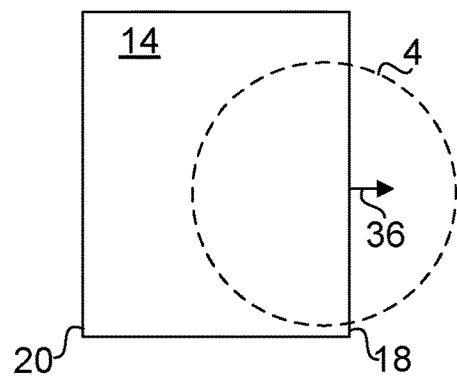
Figure 3E:
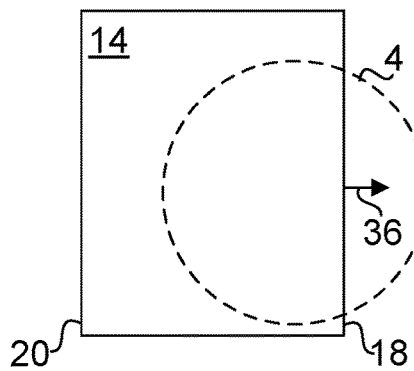
Figure 3F:
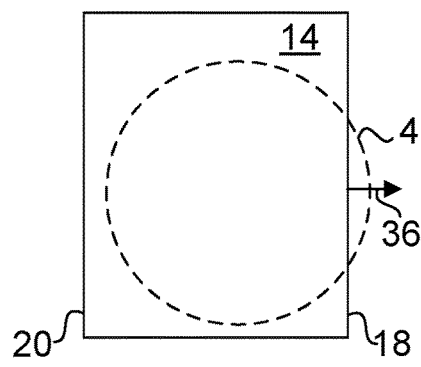
Figure 4A:
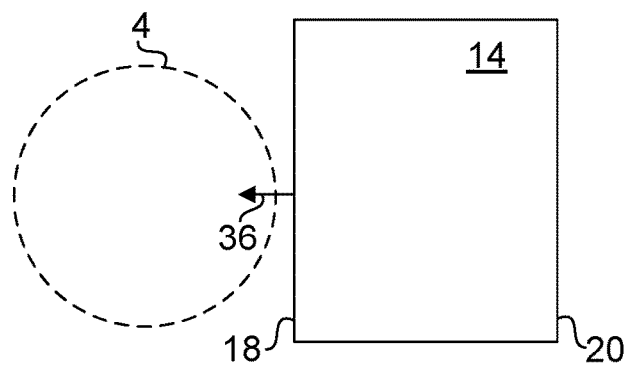
FIG. 4A-F is a series of diagrams depicting a process of moving a blocker, from right to left, into the field of view of an optical fiber while the brightness of the cast light within the field of the view and the positional data of the cast light are recorded.
Figure 4B:
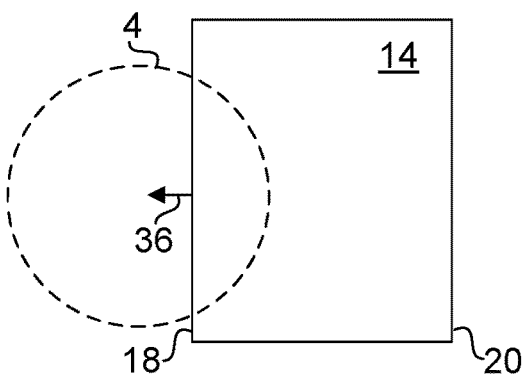
Figure 4C:
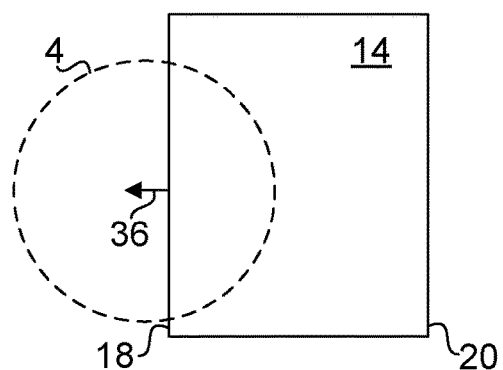
Figure 4D:
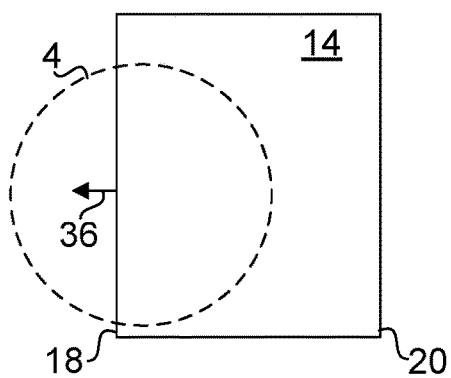
Figure 4E:
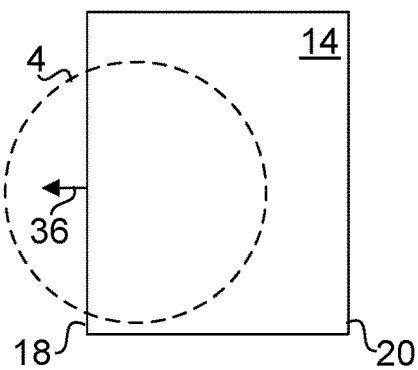
Figure 4F:
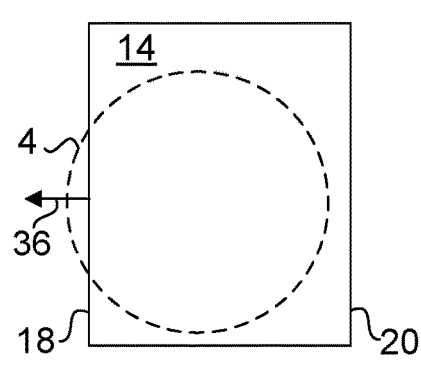
Figure 5:
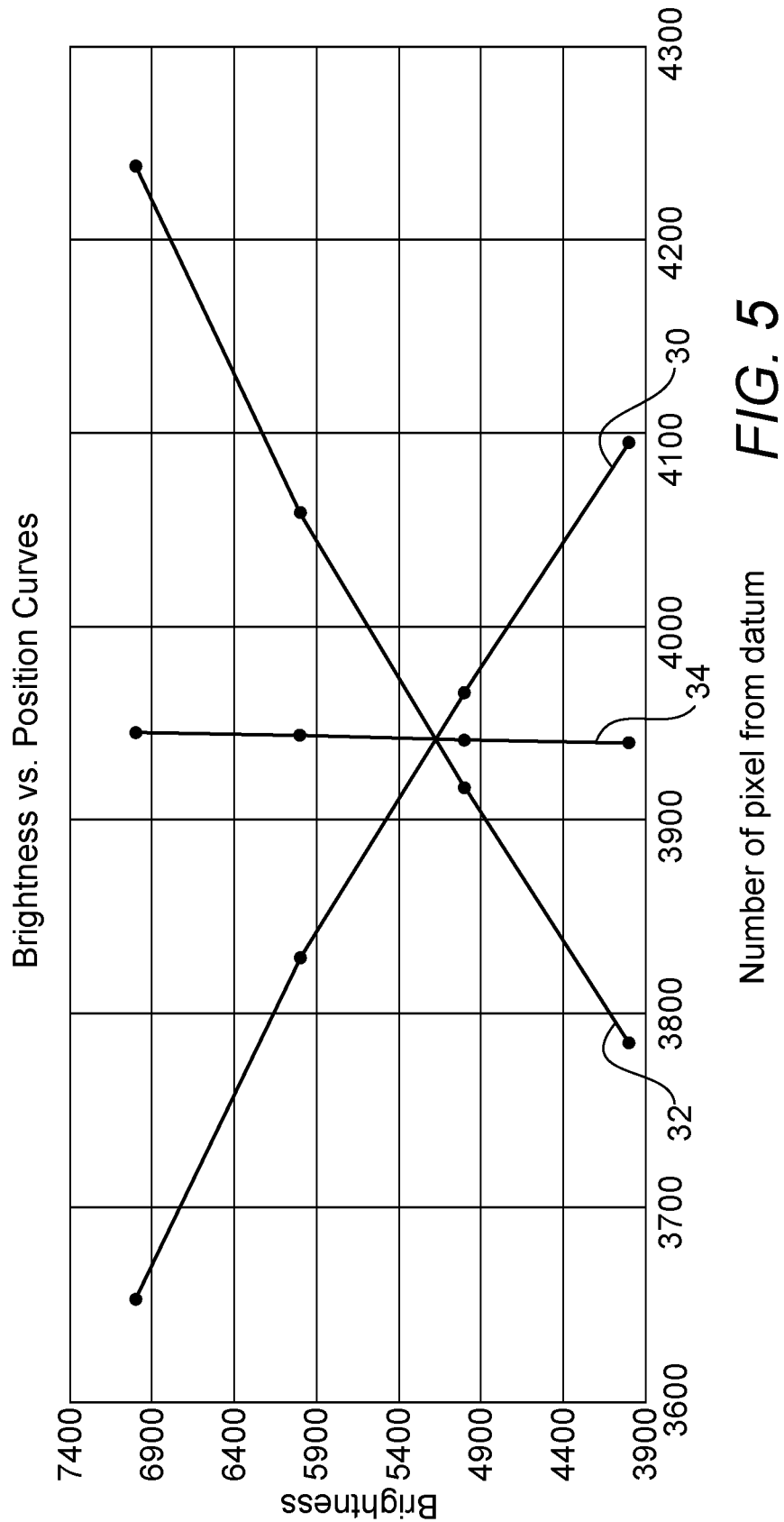
FIG. 5 depicts brightness vs. location curves for a light panel of two opposing directions and an average value curve representing the center line of the field of view.
Figure 6:
FIG. 6 is a table depicting brightness values within a field of view with respect to positional measurements of the blocker for the curves shown in FIG. 5.

FIG. 3A-F is a series of diagrams depicting a process of moving a blocker 14, from left to right, into the field of view of an optical fiber 2 while the brightness of the light panel within the field of the view of an optical fiber 2 and the positional data of the cast light are recorded. Here, the blocker 14 is moved in a direction from left to right. Therefore the leading edge 18 is the right edge of the blocker. In FIG. 3A, the blocker 14 is located completely outside of view 4. As the blocker 14 continues to be moved in the direction indicated, it enters view 4, changing the brightness detected by the imaging device 8. In carrying out the center-finding process to yield a center of a field of view of a fiber 2 disposed in an arrangement shown in FIG. 1, the following steps are followed. First, the blocker 14 is moved in a first direction and the blocker 14 is disposed at a first location, e.g., the location of leading edge 18 as shown in FIG. 3B, in the field of view when the brightness of an image within the field of the fiber is disposed at a brightness, e.g., 7000 lumens, and a first location of the blocker is recorded. The blocker 14 is moved further in a first direction, e.g., as shown in FIG. 3C, in the field of view until the brightness of the image within the field of view of the fiber is disposed at a new value, e.g., 6000 lumens, and a second location of the blocker is recorded. The blocker 14 is again moved further in the first direction, e.g., as shown in FIG. 3D, in the field of view until the brightness of the image within the field of view of the fiber is disposed at a new value, e.g., 5000 lumens, and a third location of the blocker is recorded. The blocker 14 is again moved further in the first direction, e.g., as shown in FIG. 3E, in the field of view until the brightness of the image within the field of view of the fiber is disposed at a new value, e.g., 4000 lumens, and a fourth location of the blocker is recorded. The same process continues for a yet lower brightness as shown in FIG. 3F. Although it may is suffice to obtain a single location that corresponds to a single brightness for each direction of blocker approach, the averaging of more sets of data corresponding to multiple brightness values can increase the accuracy of the average values if there is a chance that a single data corresponding to a single brightness value can be inaccurate, e.g., the lack of a light panel with uniform luminance. Upon collecting data in the first direction, the process is repeated in a direction opposite the first direction. FIG. 4A-F is a series of diagrams depicting a process of moving a blocker 14, from right to left, into the field of view of an optical fiber while the brightness of the cast light within the field of the view and the positional data of the cast light are recorded. FIG. 5 depicts brightness vs. location curves for a light panel of two opposing directions and an average value curve 34 representing the center line of the field of view. FIG. 6 is a table depicting brightness values within a field of view with respect to positional measurements of the blocker for the curves 30, 32, 34 shown in FIG. 5.

Line 30 corresponds to the brightness versus location data obtained when blocker is moved from left to right. Note that as a larger portion of the light panel 10 is obscured by the blocker 14 disposed at a lower luminance compared to the light panel 10, from left to right, the brightness detected in the field of view of the fiber decreases, therefore resulting in the downward-trending curve as the positional value increases as the blocker 14 is moved from left to right. Line 32 corresponds to the brightness versus location data obtained when blocker is moved from right to left. Note that as a larger portion of the light panel 10 is obscured by the blocker 16 disposed at a lower luminance compared to the light panel 10, from right to left, the brightness detected in is the field of view of the fiber decreases, therefore resulting in the downward-trending curve as the positional value decreases as the blocker 16 is moved from right to left. Line 34 represents an average value for each pair of positional values obtained at a particular brightness, e.g., 4000, 5000, 6000 or 7000 lumens. Ideally, line 34 should be a straight vertical line, i.e., the center of the field of view of the fiber 2 should fall on the same value regardless of the brightness from which the positional values are obtained. However, when there are more than one center, an average of the centers may be calculated and used instead. It has now been demonstrated a manner in which a center of the field of view of the fiber 2 can be obtained by moving the blocker 14 from left to right and right to left. Although not shown, it shall now be clear that a similar procedure can be executed to locate the center in directions perpendicular to the direction delineated by the movement of from left to right or from right to left.

Referring back to FIGS. 1-6, it can therefore be summarized that there is provided a system configured for determining a center of a field of view of an optical element, e.g., an optical fiber, using a surface 10 disposed at a first illumination. The system includes an image receiver 8, a blocker 14, 16, a positioner 24 and a processor 22. The image receiver 8 configured for receiving at least one image through the fiber 2 of the surface 10, wherein the image receiver 8 is disposed at a fixed perpendicular distance to the surface disposed at the first illumination. The blocker 14, 16 is disposed at a second illumination, i.e., an illumination that is not the same as the first illumination. The positioner 24 is configured for positioning the blocker 14, 16 at, at least one position such that the at least one image can be obtained by the image receiver. The processor 22 is configured with instructions to compute at least one brightness value, one for each of the at least one image. The at least one image includes at least one first image and at least one second image, the at least one first image corresponds to an image obtained with the blocker disposed along a first direction and the at least one second image corresponds to an image obtained with said blocker disposed along a second direction, wherein the second direction is opposite the first direction. Each first image corresponds to a positional value of the blocker in the first direction and one of the at least one brightness value. Each second image corresponds to a positional value of the blocker in the second direction and one of the at least one brightness value and the first direction is parallel to the surface. The center of a field of view in one of the first direction and the second direction is determined based on an average positional value of at least one pair of positional values including one of the at least one positional value of the blocker in the first direction at the at least one brightness value and one of the at least one positional value of the blocker in the second direction at the at least one brightness value. In order to locate a two-dimensional center of the fiber, the at least one image further includes at least one third image and at least one fourth image, the at least one third image corresponds to an image obtained with blocker 16 disposed along a third direction and the at least one fourth image corresponds to an image obtained with blocker 16 disposed along a fourth direction, wherein the fourth direction is opposite the third direction. Each of the at least one third image corresponds to a positional value of blocker 16 in the third direction and one of the at least one brightness value. Each fourth image corresponds to a positional value in the fourth direction and one of the at least one brightness value, wherein the center of a field of view in one of is the third direction and the fourth direction is determined based on an average positional value of at least one pair of positional values including one of the at least one positional value of blocker 16 in the third direction at the at least one brightness value and one of the at least one positional value of blocker 16 in the fourth direction at the at least one brightness value.

Figure 7:
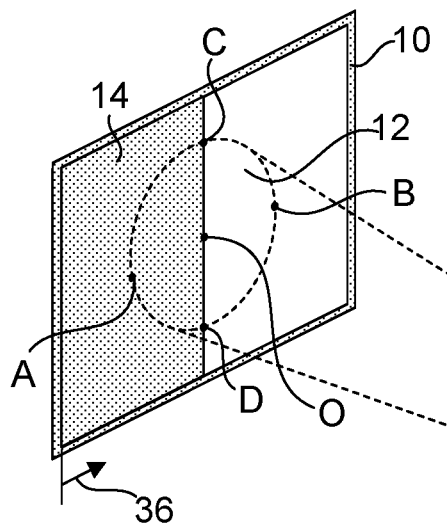
FIG. 7 is a diagram depicting a screen useful for collecting brightness vs. location data within the field of view of an optical fiber for a blocker approaching the center of the field of view from the left side of the screen.
Figure 7:
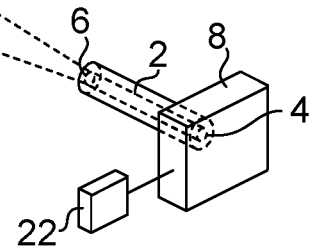
Figure 8:
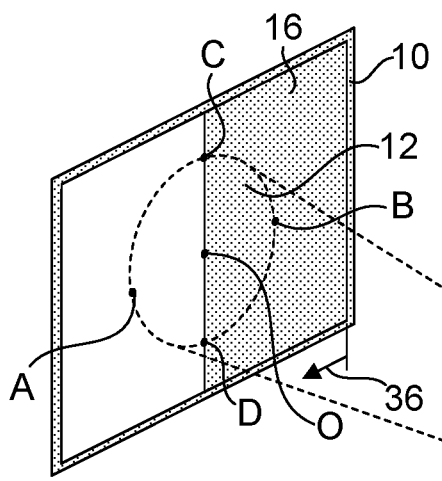
FIG. 8 is a diagram depicting a screen useful for collecting brightness vs. location data within the field of view of an optical fiber for a blocker approaching the center of the field of view from the right side of the screen.
Figure 8:
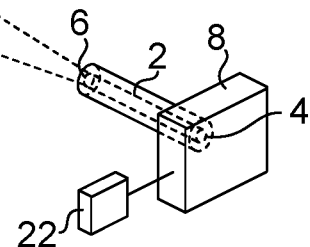

FIG. 7 is a diagram depicting a screen, e.g., computer screen 10, useful for collecting brightness vs. location data within the field of view of an optical fiber for a blocker 14 approaching the center of the field of view from the left side of the screen. Here, the light panel 10 is essentially a computer screen disposed at a first luminance, e.g., a white background and blocker 14 that is essentially also a computer-generated image with a second luminance, e.g., zero luminance or black background, that is different from the first luminance. In this embodiment, no separate light panel and blocker are required as those shown in FIG. 1. First, the brightness of area 12 as seen through the fiber 2 at view 4 is obtained as a full brightness. Then, blocker 14 is programmed to move from left to right until the brightness obtained at view 4 of area 12 is only half the brightness as before and a first position of blocker 14 is recorded. The same procedure are repeated for a second direction as shown in FIG. 8, where the second direction is opposite the first direction. FIG. 8 is a diagram depicting a screen useful for collecting brightness vs. location data within the field of view of an optical fiber for a blocker approaching the center of the field of view from the right side of the screen.

Each leading edge is represented by line "C-O-D." This is the same line representing a center along the first or second direction. Although it may suffice to rely on the positional result or one center value obtained with an approach from only one direction, an average of the two center values obtained with approaches from left and right can minimize errors due, e.g., to the contribution to a brightness that is other than the zero luminance of blocker 14. The center value is essentially the leading edge of the blocker 14, 16. If a two-dimensional center is desired, the procedure shown in FIGS. 9 and/or 10 will be further conducted.

Figure 9:
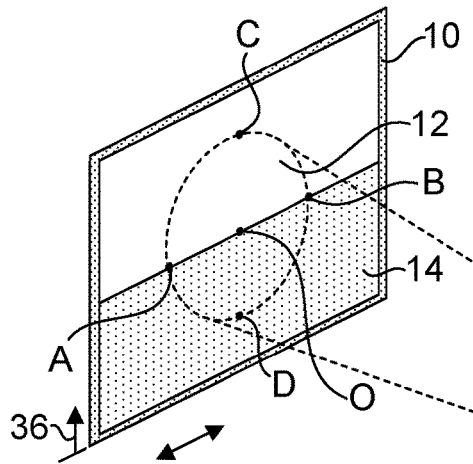
FIG. 9 is a diagram depicting a screen useful for collecting brightness vs. location data within the field of view of an optical fiber for a blocker approaching the center of the field of view from the bottom of the screen.
Figure 9:
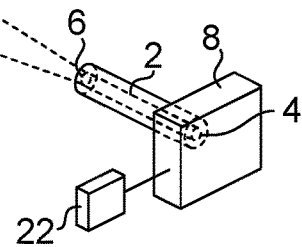
Figure 10:
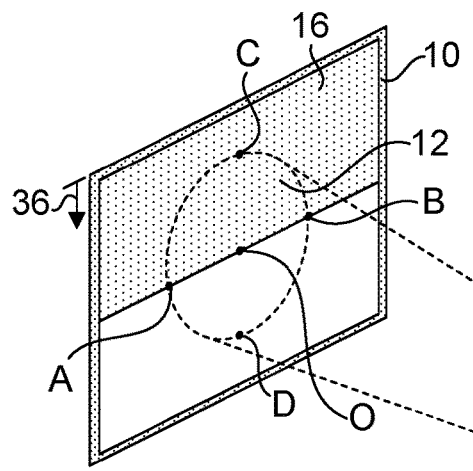
FIG. 10 is a diagram depicting a screen useful for collecting brightness vs. location data within the field of view of an optical fiber for a blocker approaching the center of the field of view from the top of the screen.
Figure 10:
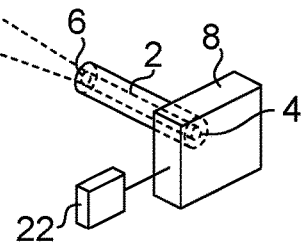
Figure 11:
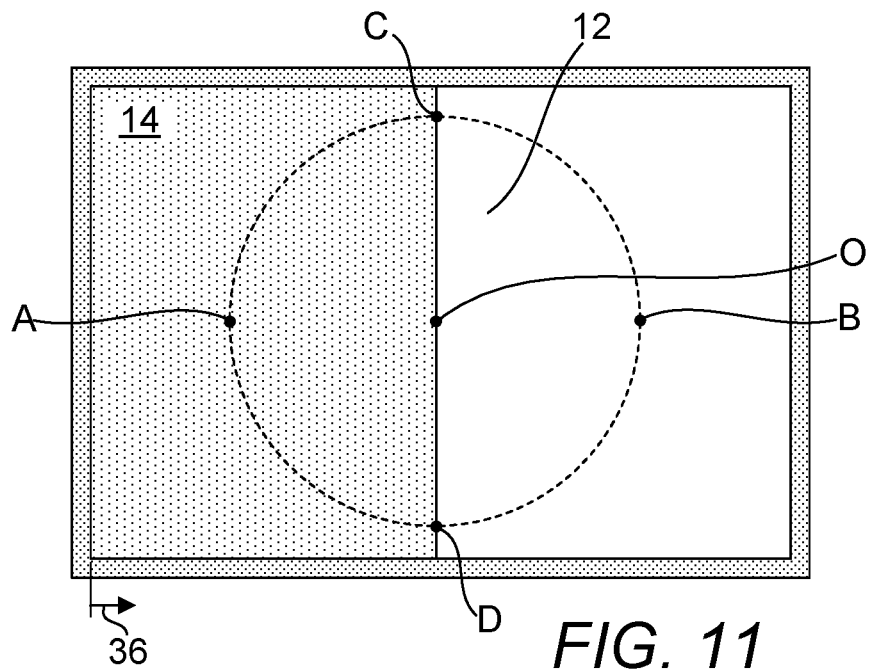
FIG. 11 depicts a screen useful for collecting brightness vs. location data within the field of view of an optical fiber for a blocker approaching the center of the field of view from the left side of the screen.
Figure 12:
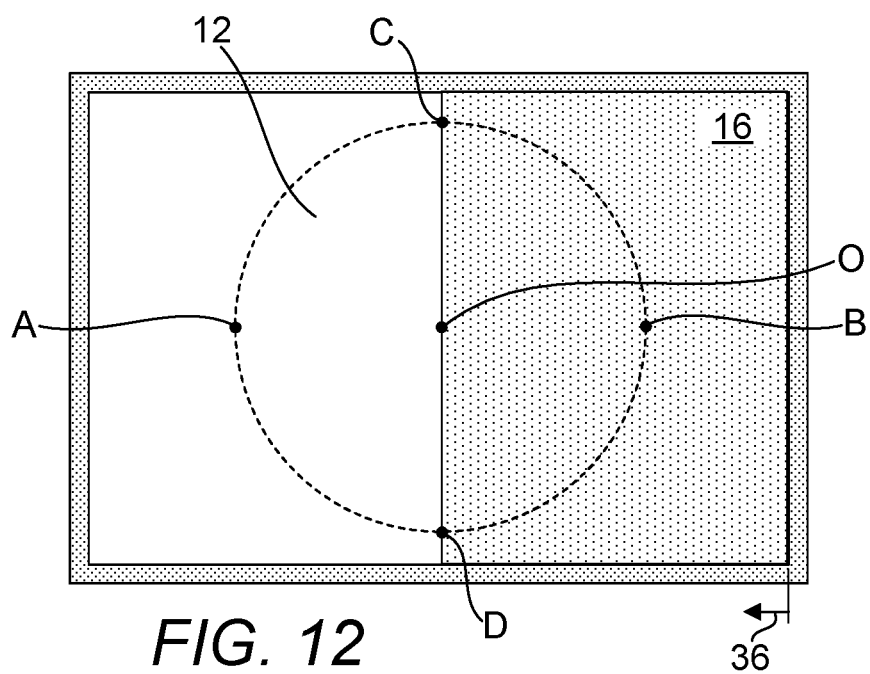
FIG. 12 depicts a screen useful for collecting brightness vs. location data within the field of view of an optical fiber for a blocker approaching the center of the field of view from the right side of the screen.
Figure 13:
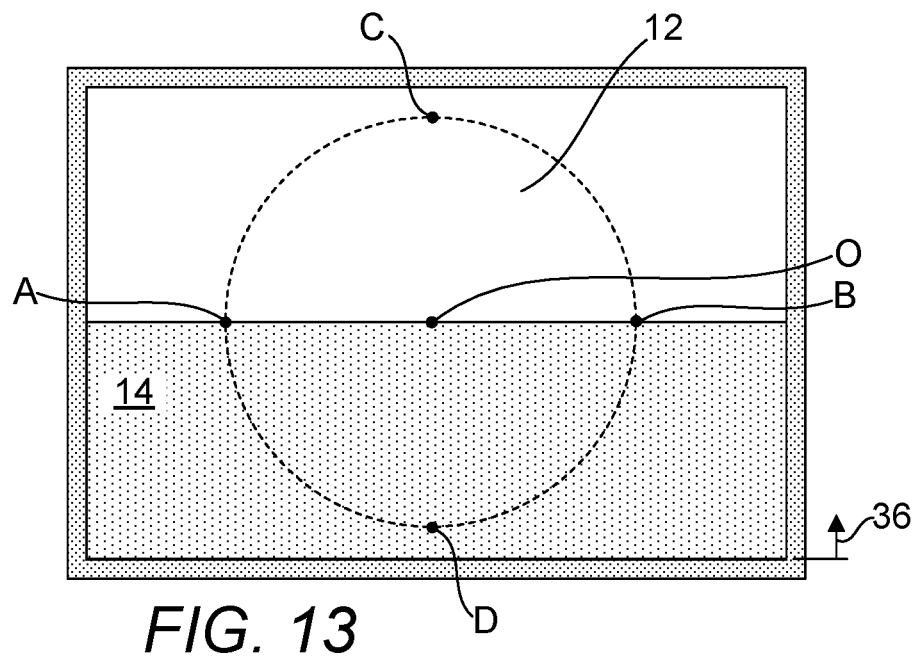
FIG. 13 depicts a screen useful for collecting brightness vs. location data within the field of view of an optical fiber for a blocker approaching the center of the field of view from the bottom of the screen.
Figure 14:
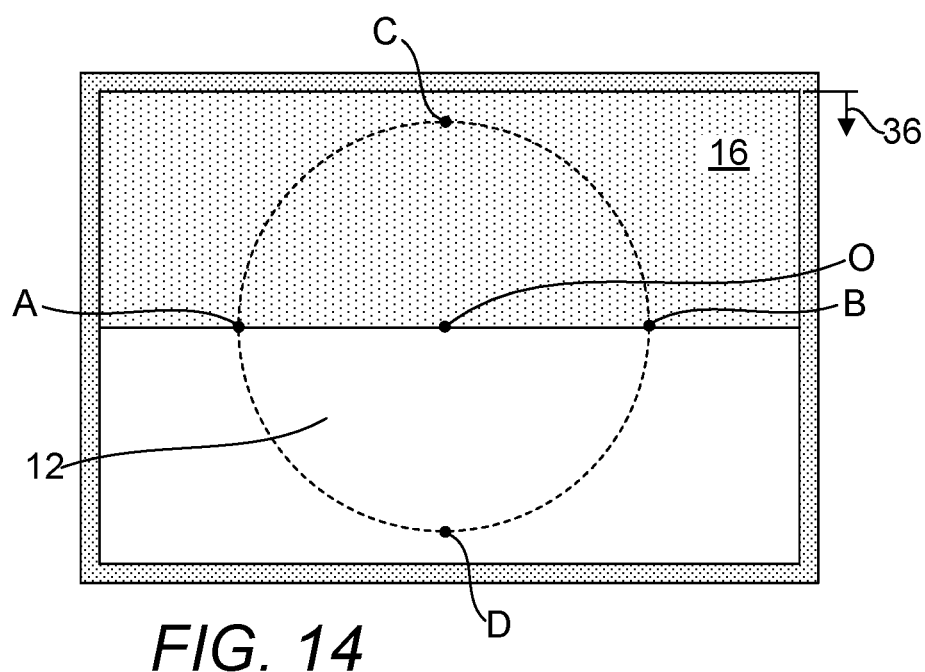
FIG. 14 depicts a screen useful for collecting brightness vs. location data within the field of view of an optical fiber for a blocker approaching the center of the field of view from the top of the screen.

FIG. 9 is a diagram depicting a screen useful for collecting brightness vs. location data within the field of view of an optical fiber for a blocker approaching the center of the field of view from the bottom of the screen. FIG. 10 is a diagram depicting a screen useful for collecting brightness vs. location data within the field of view of an optical fiber for a blocker approaching the center of the field of view from the top of the screen. FIG. 11-14 depicts a screen useful for collecting brightness vs. location data within the field of view of an optical fiber for a blocker approaching the center of the field of view from the left side, right side, bottom and top of the screen, respectively.

In one embodiment, a difference in brightness between the blocker and the surface disposed at the illumination is at least about 200 nits. In one embodiment, the illumination of the area of a light panel or a computer screen from which an image is case on the image plane of the imaging device is greater than the illumination of the blocker. In one embodiment, the illumination of the blocker is greater than the illumination of the area of a light panel or a computer screen from which an image is case on the image plane of the imaging device. In one embodiment, at least one of the illumination of the area of a light panel or a computer screen from which an image is case on the image plane of the imaging device and the illumination of the blocker and said second illumination, is a result of a Light Emitting Diode (LED).

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of is the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A system configured for determining a center of a field of view of an optical element using a surface disposed at a first illumination, said system comprising:
    (a) an image receiver configured for receiving at least one image through the optical element of the surface, wherein said image receiver is disposed at a fixed perpendicular distance to the surface disposed at the first illumination;
    (b) a blocker disposed at a second illumination;
    (c) a positioner configured for positioning said blocker at, at least one position such that said at least one image can be obtained by said image receiver; and
    (d) a processor configured with instructions to compute at least one brightness value, one for each of said at least one image, said at least one image comprises at least one first image and at least one second image, said at least one first image corresponds to an image obtained with said blocker disposed along a first direction and said at least one second image corresponds to an image obtained with said blocker disposed along a second direction, wherein said second direction is opposite said first direction, each said first image corresponds to a positional value of said blocker in said first direction and one of said at least one brightness value, each said second image corresponds to a positional value of said blocker in said second direction and one of said at least one brightness value and said first direction is parallel to the surface,
wherein the center of a field of view in one of said first direction and said second direction is determined based on an average positional value of at least one pair of positional values comprising one of said at least one positional value of said blocker in said first direction at said at least one brightness value and one of said at least one positional value of said blocker in said second direction at said at least one brightness value and said first illumination is greater than said second illumination.

2. The system of claim 1, wherein said at least one image further comprises at least one third image and at least one fourth image, said at least one third image corresponds to an image obtained with said blocker disposed along a third direction and said at least one fourth image corresponds to an image obtained with said blocker disposed along a fourth direction, wherein said fourth direction is opposite said third direction, each said at least one third image corresponds to a positional value of said blocker in said third direction and one of said at least one brightness value, each said fourth image corresponds to a positional value in said fourth direction and one of said at least one brightness value, wherein the center of a field of view in one of said third direction and said fourth direction is determined based on an average positional value of at least one pair of positional values comprising one of said at least one positional value of said blocker in said third direction at said at least one brightness value and one of said at least one positional value of said blocker in said fourth direction at said at least one brightness value and each of said third direction and said fourth direction is perpendicular to said first direction.

3. The system of claim 1, wherein the surface is a surface selected from the group consisting of a light panel and a computer screen.

4. The system of claim 1, wherein the optical element is an optical fiber.

5. The system of claim 1, wherein a difference in brightness between said blocker and the surface disposed at the illumination is at least about 200 nits.

6. The system of claim 1, wherein at least one of said first illumination and said second illumination is a result of a Light Emitting Diode (LED).

7. The system of claim 1, wherein at least one of said first illumination and said second illumination is a result of an illumination of a computer screen.

8. A system configured for determining a center of a field of view of an optical element using a surface disposed at a first illumination, said system comprising:

(a) an image receiver configured for receiving at least one image through the optical element of the surface, wherein said image receiver is disposed at a fixed perpendicular distance to the surface disposed at the first illumination;

(b) a blocker disposed at a second illumination;

(c) a positioner configured for positioning said blocker at, at least one position such that said at least one image can be obtained by said image receiver; and (d) a processor configured with instructions to compute at least one brightness value, one for each of said at least one image, said at least one image comprises at least one first image and at least one second image, said at least one first image corresponds to an image obtained with said blocker disposed along a first direction and said at least one second image corresponds to an image obtained with said blocker disposed along a second direction, wherein said second direction is opposite said first direction, each said first image corresponds to a positional value of said blocker in said first direction and one of said at least one brightness value, each said second image corresponds to a positional value of said blocker in said second direction and one of said at least one brightness value and said first direction is parallel to the surface, wherein the center of a field of view in one of said first direction and said second direction is determined based on an average positional value of at least one pair of positional values comprising one of said at least one positional value of said blocker in said first direction at said at least one brightness value and one of said at least one positional value of said blocker in said second direction at said at least one brightness value and said second illumination is greater than said first illumination.

9. The system of claim 8, wherein said at least one image further comprises at least one third image and at least one fourth image, said at least one third image corresponds to an image obtained with said blocker disposed along a third direction and said at least one fourth image corresponds to an image obtained with said blocker disposed along a fourth direction, wherein said fourth direction is opposite said third direction, each said at least one third image corresponds to a positional value of said blocker in said third direction and one of said at least one brightness value, each said fourth image corresponds to a positional value in said fourth direction and one of said at least one brightness value, wherein the center of a field of view in one of said third direction and said fourth direction is determined based on an average positional value of at least one pair of positional values comprising one of said at least one positional value of said blocker in said third direction at said at least one brightness value and one of said at least one positional value of said blocker in said fourth direction at said at least one brightness value and each of said third direction and said fourth direction is perpendicular to said first direction.

10. The system of claim 8, wherein the surface is a surface selected from the group consisting of a light panel and a computer screen.

11. The system of claim 8, wherein the optical element is an optical fiber.

12. The system of claim 8, wherein a difference in brightness between said blocker and the surface disposed at the illumination is at least about 200 nits.

13. The system of claim 8, wherein at least one of said first illumination and said second illumination is a result of a Light Emitting Diode (LED).

14. The system of claim 8, wherein at least one of said first illumination and said second illumination is a result of an illumination of a computer screen.

15. A method for locating a center of a field of view of an optical element using a system having a surface disposed at a first illumination, an image receiver, a blocker disposed at a second illumination, said method comprising:

(a) disposing the blocker at, at least one location in the field of view upon the surface in a first direction when the brightness of an image within the field of view of the optical element is disposed at a brightness and recording a first location of the blocker;

(b) repeating said disposing step in a second direction and at a brightness, wherein said second direction is opposite said first direction and each of said first direction and said second direction is parallel to the surface; and (c) averaging said first location and said second location to yield the center of the field of view of the optical element in one of the first direction and the second direction, wherein said first illumination is greater than said second illumination.

16. The method of claim 15, further comprising repeating said steps (a)-(c) by replacing said first direction with a third direction and said second direction with a fourth direction, each of said third direction and said fourth direction is parallel to the surface and each of said third direction and said fourth direction is perpendicular to said first direction.

17. The method of claim 15, wherein the surface is a surface selected from the group consisting of a light panel and a computer screen.

18. The method of claim 15, wherein the optical element is an optical fiber.

19. The method of claim 15, wherein a difference in brightness between the blocker and the surface disposed at the illumination is at least about 200 nits.

20. The method of claim 15, wherein at least one of said first illumination and said second illumination is a result of a Light Emitting Diode (LED).

21. The method of claim 15, wherein at least one of said first illumination and said second illumination is a result of an illumination of a computer screen.

22. A method for locating a center of a field of view of an optical element using a system having a surface disposed at a first illumination, an image receiver, a blocker disposed at a second illumination, said method comprising:

(a) disposing the blocker at, at least one location in the field of view upon the surface in a first direction when the brightness of an image within the field of view of the optical element is disposed at a brightness and recording a first location of the blocker;

(b) repeating said disposing step in a second direction and at a brightness, wherein said second direction is opposite said first direction and each of said first direction and said second direction is parallel to the surface; and (c) averaging said first location and said second location to yield the center of the field of view of the optical element in one of the first direction and the second direction, wherein said second illumination is greater than said first illumination.

23. The method of claim 22, further comprising repeating said steps (a)-(c) by replacing said first direction with a third direction and said second direction with a fourth direction, each of said third direction and said fourth direction is parallel to the surface and each of said third direction and said fourth direction is perpendicular to said first direction.

24. The method of claim 22, wherein the surface is a surface selected from the group consisting of a light panel and a computer screen.

25. The method of claim 22, wherein the optical element is an optical fiber.

26. The method of claim 22, wherein a difference in brightness between the blocker and the surface disposed at the illumination is at least about 200 nits.

27. The method of claim 22, wherein at least one of said first illumination and said second illumination is a result of a Light Emitting Diode (LED).

28. The method of claim 22, wherein at least one of said first illumination and said second illumination is a result of an illumination of a computer screen.

* * * * *